United States Patent
Kawato et al.

[15] 3,648,008
[45] Mar. 7, 1972

[54] METHOD OF MAKING TAPERED POLES

[72] Inventors: Tomoyoshi Kawato, Tokyo; Takashi Kusakabe, Yokohama-shi; Toshiyuki Ono, Tokyo, all of Japan

[73] Assignee: Nippon Kokan Kabushiki Kaisha, Tokyo, Japan

[22] Filed: Dec. 9, 1969

[21] Appl. No.: 883,508

[30] Foreign Application Priority Data

Dec. 11, 1968 Japan.................................43/90194

[52] U.S. Cl................................219/67, 72/198, 219/59, 219/104
[51] Int. Cl..................................................B23k 31/06
[58] Field of Search........................219/59–67, 101, 219/102, 104; 228/17; 29/157.3, 482; 72/198

[56] References Cited

UNITED STATES PATENTS

| | | | |
|---|---|---|---|
| Re.3,290 | 2/1869 | Bailey | 72/198 |
| Re.19,734 | 10/1935 | Heddon | 72/198 |
| 1,124,764 | 1/1915 | Lloyd | 228/44 X |
| 1,765,368 | 6/1930 | Frahm et al. | 29/482 |
| 3,236,083 | 2/1966 | Linderoth, Jr. et al. | 228/17 X |
| 3,329,329 | 7/1967 | Karmann | 228/17 |
| 3,361,319 | 1/1968 | Masao Sato et al. | 228/17 X |
| 3,361,320 | 1/1968 | Bobrowski | 228/17 |

Primary Examiner—J. V. Truhe
Assistant Examiner—L. A. Schutzman
Attorney—George B. Oujevolk

[57] ABSTRACT

The present invention relates a method of making tapered poles or tapered tubes, e.g., illuminating poles, or tapered tubes having diminishing cross sections for various kind of structural materials. A preformed tapered tube is inserted between miniaturized forming rollers having cam faces with a circumference of $1/n$ of the length of a tapered tube to be made, where $n$ is between 2 and 10, and as said tube is drawn at the speed as high as $n$ times the peripheral speed of the forming rollers the welding is performed on a longitudinal aligned edges of the tube so as to make desired products by means of the comparatively small high-frequency welding apparatus.

18 Claims, 10 Drawing Figures

Patented March 7, 1972

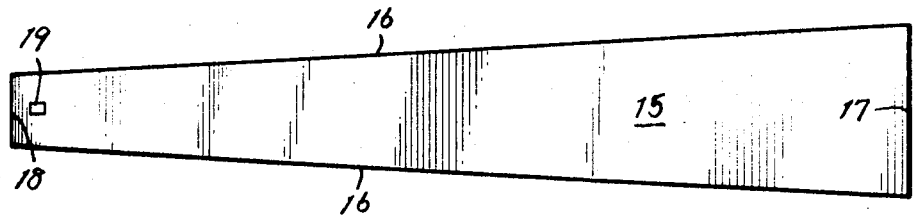
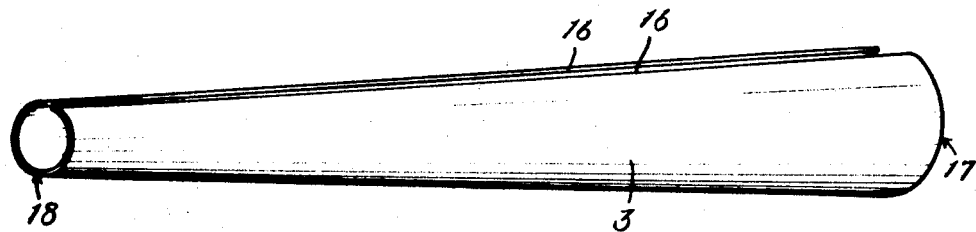
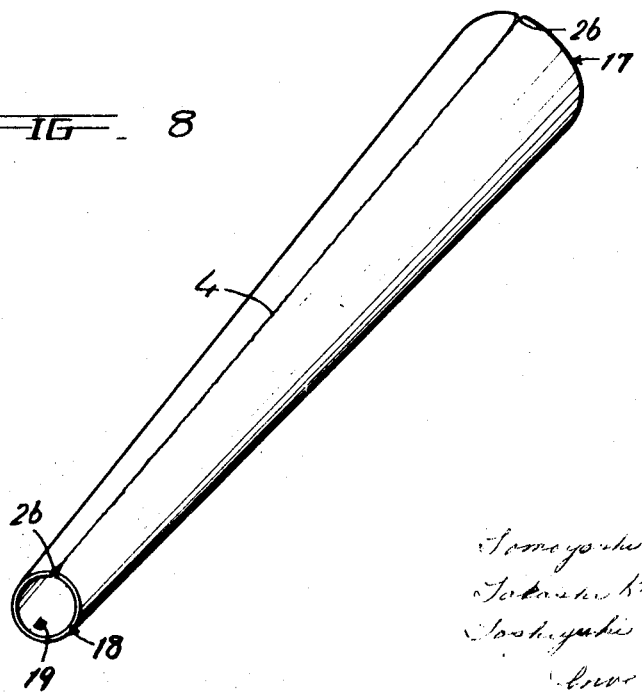

METHOD OF MAKING TAPERED POLES

BACKGROUND OF THE INVENTION

The present invention relates to the making of tapered poles, and more particularly to the use of high frequency tube welding techniques in the making of tapered poles.

THE PRIOR ART

High frequency tube welding was developed in about 1957 by Wallace C. Rudd, William Stanton and several coworkers and described in a series of patents issued to Magnetic Heating Corp. and/or New Rochelle Tool Corporation. In tube welding of this type, an elongated sheet of material is passed along a long table between a series of squeeze rollers or forming rollers. This sheet which enters the table as a flat sheet is gradually curved into a tubular shape until it reaches a welding station. At the welding station a pair of squeeze rolls squeeze the two opposite longitudinal edges of the sheet so that they come into contact forming a V-shaped junction. Electrical contacts are placed along both seams in advance of the V-shaped junction. When a high frequency current is passed between the contacts, the partly formed tube acts as a choke coil presenting a high impedance to the flow of current around the tube. This forces the current to flow along the paths of least impedance, namely along the edges between the contacts and the V-shaped junction so that only the junction, i.e., the weld point is heated.

There exists at present, several methods of making tapered tubes or poles having a cross-sectional area which decreases gradually towards the end point, as compared with conventional poles having equal cross-sectional areas at both ends. However, these methods of the prior art present certain difficulties because the forming taper cannot always be readily formed. Those prior methods may be divided into the two classes; one system is to throttle a pipe of uniform diameter to progressively vary the size; the other system is to weld a preformed tapered tube blank at its seam. The first method does not require welding but the forming process is complicated and overlap elimination treatments are necessary, so that the cost is high. Also the appearance is not always pleasing, and especially in mass production the second method is more advantageous. When the tapered tube according to the second method is closed by a welding operation, using high frequency welding on a longitudinally traveling tube, e.g., using equipment of the Thermatool, subsidiary of American Machinery and Foundry Corp. (also known as AMF), it is necessary to use the so-called radial cylinder system, the truck type system, or the large feed wheel system (U.S. Pat. No. 3,329,329). According to the radial cylindrical system, a thin pipe of little thickness such as a tapered pole will be deformed as a polygon along its cross section. In the truck-type system it is difficult to form V-shaped grooves, besides, since a truck of over 10 meters in length is moved, a practical operational difficulty exists. The foregoing disadvantages are not found in the large feed wheel system. However, in this method in order to make a tapered pole of e.g., 15 meters, it is necessary to use large rollers of 5 meters in diameter, and such large rollers are not only expensive, but also fairly hard to handle. For example, this method has the disadvantage that there is considerable trouble in the exchanging of rollers. Furthermore, welding with such large rollers is inaccurate so that the welded parts are imperfect.

The present invention has been devised to remove the foregoing disadvantages. Thus, an object of the present invention is to make exact, simple and efficient tapered poles by means of a compact apparatus. To this end the invention uses miniaturized forming rollers having circumferences reduced a fraction of the length of the tapered pole to be made i.e., $1/n$, and while a preformed tapered tube blank inserted in between such miniaturized forming rollers is fed at a precisely controlled speed as high as $n$ times the peripheral speed of the forming rollers, the welding is performed at the grooved portion. Thus, contrasting the system of the present invention with the large feed wheel system, in order to make tapered poles of 15 meters in length for a street light poles or illuminating poles, according to the prior art system, a plurality of large rollers of 5 meters in diameter approximately equal in circumference to the length of the tube are necessary so that rolling contact is maintained between tube and rollers. Therefore, arrangements used for employing such large rollers cannot but be large scaled. On the other hand, in the case of the present invention, all other components are miniaturized in company with the rollers whose circumferences are reduced to $1/n$ of that of the length of the poles. If taking an assumption that the circumferences are reduced to one-half, the mechanism in plan view becomes generally reduced to one-fourth and its volume, as well as weight is reduced to about one-eighth. The relationship between the traveling speed of the pipe and the peripheral speed of the forming rollers can be exactly regulated by means of the electrical control of the drive motor, or electric or mechanical means such as the speed reduction ratio in the gear mechanism. Alternatively, the forming rollers can be idlers and the pipe inserted at the narrow diameter side and fed between the forming rollers so that the pressing force of the rollers on the pipe will accommodate the proper amount of slipping between the pipe and rollers, thereby making it easy to obtain the same relationship. Grease, silicone lubricants, or emulsified oil are used as lubricant on the surfaces of rollers to fully control slipping therebetween, to be a liquid friction or solid friction, and in this way the desired relationship is secured and the exact operation can be made with a lower drive power. Accordingly, tapered poles are made exactly, easily and efficiently with a small size apparatus.

A further object of the invention is to provide for precise welding of seams. As stated above, in the case of a large feed wheel, since the butting and forming work of the rollers is fairly longitudinal and widely engages the tapered tube blank, it is difficult to form the groove angle for the V-shaped groove needed. In the case of the high frequency current, there is a large spacing between the portion of the tube heated to the highest or peak temperature and the portion receiving the highest or peak pressing force so that the welding cannot be carried out under the optimal condition. In the miniaturized forming rollers of the present invention, the butting and forming works are so concentrated onto a preformed tapered tube blank, and said V-shaped groove edge is so formed, as to approximate coincidence between peak temperature and pressure so that the welding can be carried out under the optimal condition, and the appearance and strength of the tapered pole are excellent.

Another object of the invention is to economically produce tapered poles. The miniaturized forming rollers are of course manufactured at a lower cost. Besides, rollers are necessarily often changed for new ones on account of wear. However, the forming rollers of the present invention are miniaturized which reduces the cost for rollers to a great extent. Further, the costs of the related components used with those forming rollers, and, the driving power is much more economical. Also, a suitable V-shaped groove can be formed, using the present invention, so that the parts at the highest temperature and receiving the highest pressing force will approximately coincide so that the power requirements of the high frequency welding becomes economical and taper poles at low cost can be produced.

A still further object of the invention is to make tapered poles in high yield. In this type of tapered pole production, it is natural to preform a tapered tube blank from a trapezoidally shaped plate sheet (herein also referred to as "trapezium shape") and to process this plate as in conventional tube welding between squeeze rollers along an elongated table and then to weld the longitudinal abutting edges so as to make tapered poles. However, in this type of arrangement, when plate material is fed between the rollers and is formed so that the straight longitudinal edges are presented for welding at a welding station, there inevitably occurs portions on which welding is impossible. That is to say, at the beginning of feeding the plate material between the rollers, the welding is carried out after the longitudinal edges are forced together, and at the end part of the plate material, a guide piece which forms the groove angle for useful welding is taken off so that the welding operation is impossible on those end parts and the nonwelded parts remaining on the length are in proportion to the diameter of the rollers. Accordingly the nonwelded part is long in the prior art systems wherein the forming rollers are big, non-weldable parts at both ends are large. With the miniaturized forming rollers of the present invention, the abutting point of the longitudinal edges can be closer to the centerline from the center to center of both rollers and the guide piece can also approach this point so that nonwelded parts on both ends, i.e., losses are greatly reduced to obtain products in high yield. Thus, said losses on both ends are reduced to a fraction of a millimeter in comparison with products by the system of the prior art where the loss was 20-40 mm.

SUMMARY OF THE INVENTION

Generally speaking, the present invention contemplates the fabrication of tapered tubes of high frequency welding techniques. The preformed tapered tube blank is presented to a welding station where the longitudinal seams to be welded are brought together forming a V-shaped junction by passing the tube between a pair of cam-faced forming rollers, the circumference of the forming rolls being only a fraction of the length of the tube to be welded, said fraction being less than one-half, but more than one-tenth said length.

BRIEF DESCRIPTION OF THE DRAWINGS

FIG. 6 is a plan view of the plate piece used as the starting material;

FIG. 7 is an oblique view of a partly formed tapered pole using the plate piece shown in FIG. 6; and FIG. 8 is an oblique view of the finished product made according to the present invention.

DETAILED EXPLANATION OF THE INVENTION

Figure 1:
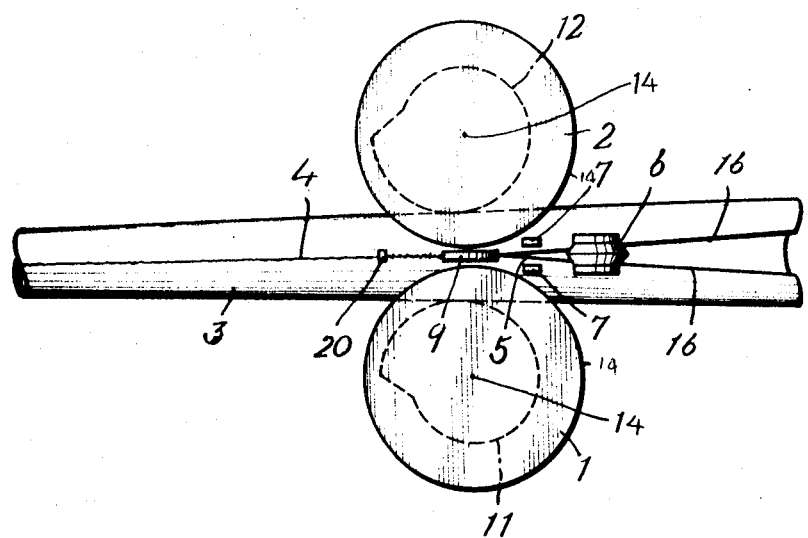
FIG. 1 is a plan view showing the making of a tapered pole according to the present invention.

The present invention makes use of miniaturized forming rollers whose circumferences are reduced to $1/n$ of the length of a tapered pole to be made. The value $n$ of this reduction rate is arbitrarily chosen, but the value is generally in the range of 2 to 10, that is, when the value is below 2 there is no advantage in adopting the miniaturized forming roller, and sufficient size reduction and V-shaped groove angle may not be provided in a suitable range. Also the optimum positions of temperature and pressure will be inconsistent at the time of the high frequency welding operation. When the value $n$ is above 10, the forming rollers are too small to exactly form tapered poles, and the advantages due to the substantial miniaturization will be little, and further the alignment between the peripheral speed of the forming rollers and the drawing speed of the tube is difficult to be accurately maintained. The preferable values are 4 to 7, and tapered poles of 10 to 30 meters can be easily produced by adopting the value $n$ in such a range.

A preformed tapered tube blank is inserted with its end of narrow diameter between said forming rollers and is advanced by pulling or pushing, as the case may be. A plate piece which has been cut out as shown in FIG. 6, i.e., being narrow at one end and wide at the other end according to the length of a tapered pole to be produced is preformed as a tube blank in U-shape or O-shape, and after that, it is formed to bring together the two longitudinal edges between the forming rollers so as to be welded as in the conventional tube welding method aforementioned. In the present invention, adjusting the relative rotational speed of rollers for the desired objective can be accomplished by inserting a tapered tube blank with the end of wide diameter. In this case, the pulling force is advantageously comparatively low, but the speed of the forming rollers must be accurately controlled, and if there is an error, especially when the rotation of rollers is delayed a tube is formed of a gradient which is wider than the diameter so that the longitudinal edges are not matched and the desired welding is not performed. In case the operation is begun with the small diametered end, when the rollers are a little delayed in rotation the stretching force is to reinforce the rotation to preferably form the edges. It is recommended that the rollers be controlled to be delayed a little when a tube is inserted with the small diametered end, and in this manner a preferred welding is provided even if a fluctuation occurs in the drawing speed or driving speed of the rollers and there remain unevennesses on the both ends of the plate piece.

In this way, the feeding speed of the tube and the peripheral speed of the rollers related to each other with approximate precision. This speed relationship is established by said reduction rate in the driving speed of a motor for the forming rollers and that of a motor feeding a tube blank, that is, the tube blank is fed at the speed as high as $n$ times the peripheral speed of the rollers. The speed control means is set at a predetermined rate in decelerating ratio by means of speed change mechanism arranged with chains, shafts and gears which are moved by a suitable prime mover. A similar controlling means utilizing oil pressure is arranged, or the forming rollers are merely fitted so as to suitably adjust to the pressing force to a tube blank, thereby enabling the passage of the tube blank between the forming rollers, which is in inverse proportion so that the same speed relationship is established as in the mechanical or electric method between the tube and roller speed. The speed control is also obtainable with controlling means where friction and other factors are taken into consideration for the rotation of the rollers. In case a tube blank is fairly thick and the lirge squeezing force is necessary for the welding operation owing to the miniaturized forming rollers, then an ultrasonic arrangement is used, which is a useful means for reducing friction resistance, and the friction resistance is reduced to a fraction during feed. A lubricant such as machine oil, silicon oil, or emulsified oil should be used between the forming rollers and the tube blank and such a lubricant does not affect the electrical properties of high frequency welding. In this connection, this lubricant should be of course controlled in its function and the amount used when the fitting rollers are adjusted in pressure to the workpiece material so as to provide a desired alignment.

Figure 2:
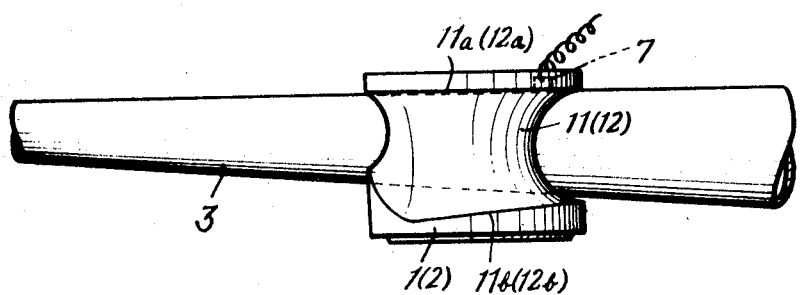
FIG. 2 is a side view of the forming rollers.

FIG. 1 shows one embodiment where the miniaturized forming rollers are used, and in this embodiment the forming rollers 1 and 2 are respectively provided with cam faces 11 and 12 of large and small diameters which are of circumference of about one-fifth of the length of a tapered pole to be made. Therefore, the diameters of those forming rollers 1 and 2 for a 15 m. tapered pole are about 1 m. or less, which denotes that the materials for making rollers of this invention are reduced below one one-hundredth, as compared with the prior large rollers whose diameter is 5 m. or more. A cam 11 of the forming roller 1 serves as a contacting material for the electric conduction of high frequency resistance welding, or when a welding head is fixed for welding, sides 11a and 12a of the cam faces 11 and 12 are intersected at right angles by rotational axis 14, and therefore, the inner sides 11b and 12b are at an acute angle to the sides 11a and 12a as shown in FIG. 2, so that the taper is increased with respect to the rotational axis 14. A contact for the high frequency resistance welding is fixed in position on side 12, thereby enabling the formation of an exact contact relationship in the process of drawing the tube blank 3. Such a preferable contact relationship is so arranged that it is unnecessary to have an adjustment of the placed positions of the contacts according to the rate of taper in line with the welding. The tube blank 3 is inserted in between forming rollers 1 and 2, and the forming rollers 1 and 2 press one of the tube blank seams to the other, and the tube blank 3 is fed in such a manner and at a speed as high as five times the peripheral speed of the rollers.

The forming rollers of this invention may be so designed as to change or adjust the welding to the tube blank 3 so as to draw this tube which is formed in U-shape or O-shape. In this way, the rollers press to form the tapered tube which increases in electrical resistance except at the seam to be welded. The rollers provide an approximately constant pressing force between both longitudinal sides so as to perform beautiful welding. However, if the pressure of the rollers is not changed or adjusted continuously, then a space is created between both sides of the U-shaped or O-shaped tube blank 3, which is wide at the large diameter and narrow at the small diameter, and the resistance is small at the large diameter but the space is large, and these relationships are reverse at the small diameter.

In the embodiment shown in the drawing, seam welding is performed to form a seam 4 by passing a high frequency current through the contacts 7, 7 to the V-shaped groove 5 for the high frequency resistance welding, this groove being formed at 3° to 8°, especially 5° to 8° by means of the grooving roller 6. This type of high frequency resistance welding as presently developed by the successor companies of New Rochelle Tool Corp., namely the Thermatool Machine Company of Rochelle, N.Y. and generally called Thermatool welding, e.g., the high frequency resistance by the direct electric conduction of 200 to 450 kc. applied to the welding groove 5 with said contacts 7, 7. In this case, the skin effect and the proximity effect work together so as to heat concentratively at around 1100° to 1200° C. the contacts 7, 7 and the end portions of the groove 5, and the thus heated parts are pressed and butted by the pressing force between the rollers 11 and 12. In one example, various kind of basic tubes 3 of 3.0 to 4.0 mm. in thickness were operated with an output of 150 to 400 kw., especially 200 to 300 kw. through said contacts 7 and 7 at a high frequency of 100 to 600 kc., especially 200 to 400 kc. and the welding rate of 10 to 40m./min, especially 20 to 40m./min. All the welding could be performed smoothly and exactly.

Figure 4:
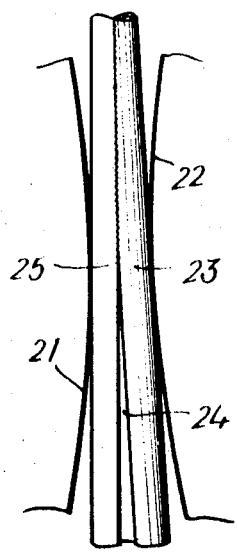
FIG. 4 is a plan view showing the making of a tapered pole according to large rollers of the prior art, especially showing the state of the groove to be seam welded.
Figure 3:
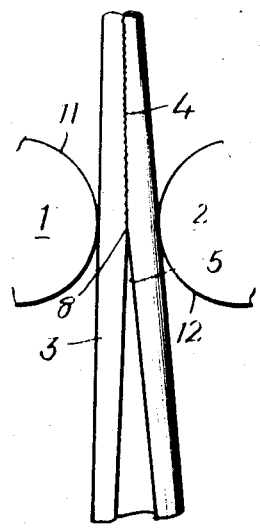
FIG. 3 is a plan view partially showing the state of a groove to be seam welded between the forming rollers.

When practising such a high frequency resistance welding, according to this invention, said V-shaped groove 5 is made so that the high temperatured location and the abutting point for the welding coincided more closely. FIGS. 3 and 4 contrast the present invention and the prior art and show examples of the abutting point and the V-shaped groove by the arrangement of this invention and of the conventional large diameter rollers, and it is apparent that a preferable V-shaped groove 5 and abutting point 8 are provided in comparison with the V-shaped groove 24 and abutting point 25 of a tube blank 23 using conventional large rollers 21, 22.

An important consideration in fixing the size of the forming rollers and contact rollers in the vicinity of the weld point is the fundamental scientific principles involved in high frequency welding. To appreciate this point, it is necessary to start with the first equation appearing on the first page of the first textbook on electricity, namely $E=IR$ where $E$ is the voltage, $I$ the amperage and $R$ the resistance. In alternating currents, this is rendered as $E=IZ$ where $Z$ is the impedance, $Z$ in turn being equal to $\sqrt{R^2+X_L^2}$ and $X_L$ in turn is equal to $2\pi fL$ where $f$ is the frequency and $L$ is the inductance in henries.

Figure 5A:
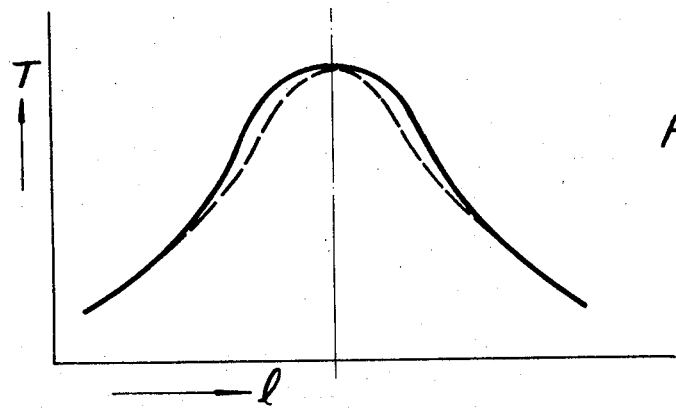
FIGS. 5a, 5b, and 5c are diagrams showing, in comparison with the prior art large rollers, the distributions of temperature and pressure at the time of the high frequency welding operation in accordance to the present invention.
Figure 5B:
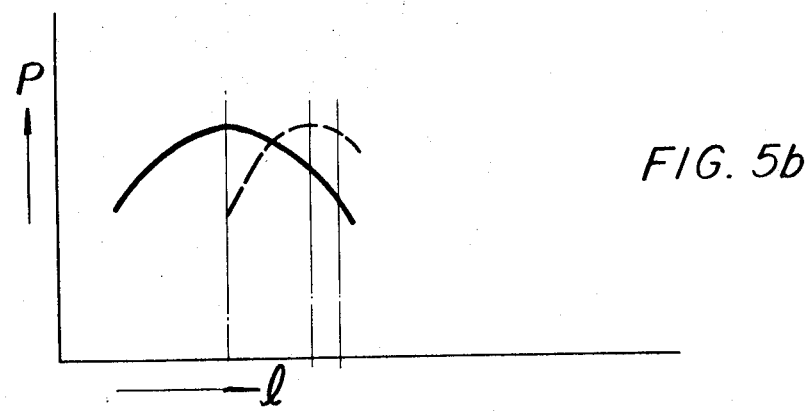
Figure 5C:
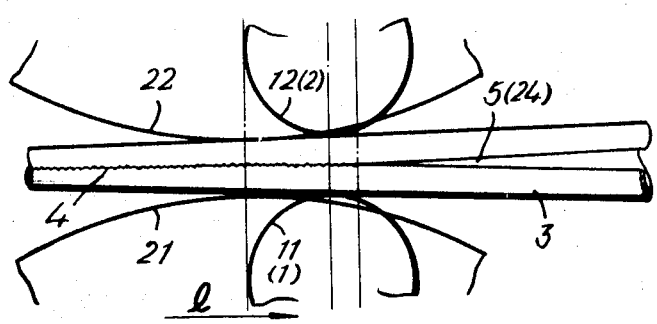

Although the factor $X_L$ is unimportant at low frequencies, as is obvious from the foregoing equation, as the frequency increases, the reactance $X_L$ increases. Therefore, in high frequency tube welding, the workpiece itself, namely the tube acts as a high reactance coil and effectively prevents the passage of the working current around the back of the tube but on the contrary directs the flow of current along the edges to be seam welded. Considering now, FIGS. 3 and 4, wherein the prior art system is shown alongside the system of the present invention, it is quite apparent that the larger the diameters of the rollers, the greater the conductance. Consideration should be given to the configuration of the rollers. Thus, although a large part of the reactance presented by a tube as a one-turn coil is caused by the fact that the tube is hollow, while a drum is not a hollow tube, i.e., the rollers of the present invention are certainly not drum-shaped, the inner cam face of the rollers of the present invention have many of the features of a hollow tube. The smaller the diameter of the roller (within a certain degree), the greater this effect is enhanced. Thus, in the large rollers of the prior art, there is a considerable escape of working electrical power around the back of the rollers where it is not needed, whereas in the present invention, the flow of current avoids the high reactance face and back of the roller, and is concentrated along the edges of the rollers, so as to flow along the edges of the tube to be seam welded. It is quite obvious from a study of FIGS. 3 and 4, that some sort of tradeoff has to be made between electrical and mechanical advantages. In the large diameter rollers of the prior art there is in fact a mythical mechanical advantage. In the present invention, the mechanical features, i.e., squeeze pressure are made to coincide, as far as possible, with the electrical features. The designers of the large squeeze rollers of the prior art appear not to have given proper weight to the electrical factors considered herein. Those welding relationships are shown in FIG. 5. The distribution curves of temperature along the V-groove seam and pressing force according to this invention are respectively shown in dotted lines, and under the temperature and the pressure in FIGS. 5a and 5b. The highest temperature and the highest pressure are closer along the V-groove seam as shown in FIG. 5c, so that welding is carried out under the optimal condition. On the other hand, using the conventional large rollers as shown with solid lines, the curves are such that the highest pressure is prior to the highest temperature so that the welding is by far inferior to that of this invention. In any event, the weld in the present invention is excellent, which may be recognized by visual examination.

When using high frequency resistance welding, the characteristics of the present invention are best displayed and tapered tubes or poles are produced at speeds as high as 20 to 40 m./min. However, the present invention is not limited only to the welding equipment produced by the Thermatool people. The invention can be applied to any arrangement wherein current is caused to flow along the V-groove 5. The speed of welding is approximately the same as when using the system suggested by the Thermatool people. Thus it is possible to use resistance welding where the welding is also done using a V-shaped groove 5 and using an electrode roll which is pressed at right angles to tube workpiece, or electron beam welding where the heating is centralized on a part to be welded to carry out the welding with lower electric power. When high producing speed is not desired, then it is also possible to use the carbon or other electrodes, or to adopt any kind of the welding methods, arc welding using welding wire as the electrode, electro slag welding, etc. The inventors used well-known arc welding techniques instead of the high frequency by means of the contacts 7, 7 and the welding was smoothly performed at speeds of 1.5 to 1.7 m./min. Also, large rollers of 5 m. in diameter were not used and so the welding head and other welding accessories freely approached the V-groove, and ordinary welding was performed with ordinary welding machinery without difficulty.

For the purpose of giving those skilled in the art a better understanding of the invention, the following illustrative examples are given:

EXAMPLE 1

SS41 steel plate of 3 mm. in thickness was cut to form as shown in FIG. 6 forming a trapezium plates 15 of 581 mm. base, 245 mm. top and 8,105 mm. in length, and a hole 19 was made at the top to catch the workpiece with a hook.

The plate 15 was preformed sectionally in O- or U-shape, as shown in FIG. 7 with opposite edges 16, 16 aligned with each other so as to make the end 17, 200 to 208 mm. in diameter. Several workpieces were prepared. In one case, the diameter in the direction parallel with a straight line connecting both edges 16, 16 was 203 to 208 mm., and the orthogonal diameter was 300 to 205 mm. and the end 18, 83 to 89 mm. in diameter. In another case, the diameter in the direction parallel to a straight line connecting edges 16, 16 was 86 to 89 mm., and the orthogonal was 83 to 86 mm. Thus, several tube blanks 3 shown in FIG. 7 were prepared, spaces between both edges 16, 16 being 40 to 50 mm. at the large diameters and 14 to 19 mm. at the small diameters. Those tube blanks were inserted with the end 18 between the miniaturized forming rollers 1 and 2 reduced where $n=5$. A pressing force of around 8 tons was applied to rollers 1 and 2 and guided by grooving roll 6 fitted between both edges 16, 16; an upper push roll 9 was furnished to slightly press down on both contacting edges so as to accurately align the edges 16, 16, the current of 300 kw. output was conducted for a 400 kc. high frequency source to carry out high frequency welding; and just after the welding bulges of welded bead were cut off with a bead cutter. The drawing speed of the tube blank, i.e., the welding speed was 30 m./min, and it took 12 to 18 seconds for welding, and on an average 48 seconds per one pole, in addition to the handling time. The tapered pole products thus obtained were as shown in FIG. 8. The lengths of nonwelded parts 26 in the weld line 4, were 20 to 30 mm. on the small diameter side 18 and 30 to 50 mm. on the large diameter side 17. Accordingly, both ends were cut off 52.5 mm. to obtain perfectly welded tapered poles of 8,000 mm. taking 14 hours to produce 1,000 pieces of tapered poles per day, thus providing mass production. In this connection, when lots of tapered poles were examined as to the precision of the circle, errors were below 2.5 mm. at the large diameter end 17 and 0.2 to 0.5 mm. at the small diameter 18, and this confirmed that the products were useable for telephone poles in the city, the tapering gradient of which is one seventy-fifth.

EXAMPLE 2

Welding the same workpiece as in Example 1 under the same condition, the current of 10 kv. and 23 a. (i.e., 230 k.v.a.) was supplied through the contacts 7, 7 for the same high frequency current to operate a high frequency welding apparatus made by the Thermatool people. In this case, the preferable drawing speed (i.e., welding speed) was 20 m./min. and an excellent product as in Example 1 was made in an average of 52 seconds per piece, including handling time.

EXAMPLE 3

Welding the same workpiece as in Example 1 under the same condition, the current of 12 kv. and 30 a. (i.e., 360 k.v.a.) was supplied through the contacts 7, 7 for the same high frequency current to operate a high frequency welding apparatus made by the Thermatool people. In this case the preferable drawing speed was 40 m./min. and an excellent product as in Example 1 was made continuously on an average of 45 seconds per piece, including handling time.

EXAMPLE 4

Several blanks of SS41 steel plate of 21 mm. in thickness were used. Each blank was cut out to form the trapezium plate of FIG. 6, 2,530 mm. base, 1,270 mm. top and 30,200 mm. in length. This plate was preformed sectionally in O- or U-shape in accordance with the method of Example 1, so that the space was 66 to 75 mm. at large diameter and 28 to 33 mm. at small diameter. As in Example 1, those blanks were inserted with small diameter sides to be pressed between the miniaturized forming rollers 1 and 2 whose size was reduced to $n=7$, and in this case there was applied to these forming rollers 1 and 2, 20 kc. ultrasonic vibration to reduce friction, and the power of 28 kv. and 50 A. (1,400 k.v.a.) was used at high frequency as in Example 1 to preform the welding. The drawing speed of tube blank was 30 m./min. and it took 3 to 4 minutes per piece in addition to handling time. Both ends were cut off 100 mm. to obtain tapered poles as long as 30 m. and properties of welded parts were very good, the products were used as tapered poles for supplying electricity, signal poles and various kind of structural materials.

EXAMPLE 5

In this example electrode rolls were used. SS41 steel plate of 4.0 mm. in thickness was cut out to form a trapezium plate of 1,030 mm. base, 560 mm. top and 11,110 mm. in length. This plate was preformed sectionally in O- or U-shape with a space of 45 to 50 mm. at the large diameter and 15 to 19 mm. at the small diameter, i.e., tube blanks such as shown in FIG. 7 were prepared. Those blanks were inserted between miniaturized forming rollers 1 and 2, whose circumference were reduced to $n=5$, and as the grooving roll 6 was guiding between both edges insulation was furnished at the longitudinal matching edges and a current of 5 V. of 66,000 a. (330 k.v.a.) was supplied for the resistance welding. The drawing speed of the tube 3 was variously changed within the ranges of 30 to 40 m./min. and in all cases the desired welding was provided. It took 60 to 70 seconds per piece in addition to handling time, and both ends were cut off 55 mm. to obtain the basic tapered tube of 11 m., and the products were used for steel pipes of 271 kg. weight for supplying electricity.

EXAMPLE 6

The same plate as in Example 5 was used on which welding grooves of around 15° was formed and a preformed workpiece, in O- or U-shape was formed. This workpiece was fed between the same miniaturized forming rollers 1 and 2 as in Example 5, and as the grooving roll was used for guiding welding wire which was used as the electrode, instead of the electrode rolls in Example 5 so as to perform automatic arc welding method which was carried out as this welding wire was being continuously supplied to the part to be welded. The welding speed in this case was 1.5 to 1.6 m./min. and the basic tube 3 was drawn in accordance with this welding speed and the forming rollers 1 and 2 were adjusted for rotation at a speed as high as one-fifth of the drawing speed. As in the above examples, excellent tapered poles were obtained. It took 8 minutes per piece in addition to handling time, but being that the welding was done by automatic arc welding, bulges hardly occurred. It was, therefore unnecessary to cut off bulges after welding as in previous examples.

EXAMPLE 7

Stainless steel was used of the same size as in Example 1 and electron beam welding was performed. In this case, as is well known, the electron from the filament in the upper column is adjusted in focus at the magnetic lens coil in the lower column so that the current is focused in a width of below 2 mm. through the orifice plate. It was confirmed on the basic plate workpiece of this Example, that a current of 30 kv. and 100 ma. was applied thereto so that the welding was well done at a welding speed (drawing rate) as high as around 2 m./min. and when this current was 100 kv. and 300 ma. (30 k.v.a.) superior welding was performed similarly even at welding speeds of 20 m. or more. That is, the electricity supplied is enough if it is one-tenth, that of Examples 1 to 4. The products of this Example in which stainless steel was used were beautifully tapered poles, which are preferable for such use as flag poles or indoors, and especially when being used for street light poles and the like they will contribute to the town beauty.

We claim:

1. A method of making tapered poles, comprising the steps of:
   a. preforming a trapezoidal workpiece which is cut out in accordance with the size of a predetermined tapered pole into a conical tube with a gap between the longitudinal side edges;
   b. inserting said tubular workpiece so that both sides of said workpiece are oppositely disposed into an appropriate space between push and forming rollers having a circumference of $1/n$ the length of the tapered pole to be made, where $n$ is a number between 2 and 10 and drawing said workpiece therefrom;
   c. applying a pressing force to one or both of said forming rollers so as to bring together the longitudinal edges of the tubular workpiece at a weld point; and,
   d. welding a seam defined by said edges at said weld point while drawing said tubular workpiece between said rollers at a speed substantially greater than and as high as $n$ times the peripheral speed of the forming rollers in the same direction.

2. A method as set forth in claim 1, including creating, between opposite longitudinal edges of said tapered tubular workpiece, a space which is large at the large diameter and is gradually small towards the end part of the small diameter, and inserting said workpiece between and drawing it out from said miniaturized forming rollers as a fixed pressing force is being applied to at least one of said forming rollers so as to weld said defined seam.

3. A method as set forth in claim 1, wherein said edges are brought together at a point forming a V-shaped weldpoint.

4. A method as set forth in claim 3, using miniaturized forming rollers in which the value of $n$ is in the range of 4 to 7.

5. A method of making tapered poles, comprising the steps of:
   a. preforming a trapezoidal plate which is cut out in accordance with the size of a predetermined tapered pole;
   b. shaping said plate as a cone;
   c. inserting said preformed cone with both longitudinal edges opposite each other in a defined space between miniaturized forming rollers having circumferences which are $1/n$ of the length of the tapered pole to be formed;
   d. interposing a guide member in between said longitudinal edges;
   e. applying a rotational pressing force to one or both of said forming rollers so as to bring said edges together at a weld point forming the apex of a V-shaped groove; and,
   f. contacting a contactor to said groove edges while drawing said cone at a speed substantially greater than and as high as $n$ times the peripheral speed of the miniaturized forming rollers in the same direction while supplying a high frequency current to said contacts.

6. A method as set forth in claim 5 using current above 150 kw. for the high frequency current of a frequency of about 100 kc. to about 600 kc. supplied to the contacts to perform the welding as the cone is being drawn at the rate of about 10 to about 40 m./min.

7. A method as set forth in claim 6, using the current of about 200 kw. to about 300 kw.

8. A method as set forth in claim 7, using high frequency current of about 200 kc. to about 400 kc.

9. A method as set forth in claim 8, wherein the cone is being drawn at the speed of about 20 to about 40 m./min.

10. A method as set forth in claim 5, including forming V-shaped groove for welding of 3° to 8° between said longitudinal edges.

11. A method as set forth in claim 5, including applying ultrasonic vibration to the miniaturized forming rollers so as to reduce friction while passing the cone between said forming rollers.

12. A method of making tapered poles, comprising the steps of:
   a. presenting a preformed conical tube blank having unseamed opposed longitudinal edges at a workstation, having thereat a pair of cam-faced squeeze rollers said cam-faces forming an inner concave groove, the central circumference of said squeeze rollers forming an involute curve, the top and base of said squeeze rollers being substantially circular, so that the passing of a tube between said rollers will apply a squeeze force to a tube of gradually changing diameter corresponding to the gradient thereof, the circumferences of said squeeze rollers being between one-half to one-tenth the length of the tube, the start of the passage of said preformed tube between said squeeze rollers forming a V-shaped groove;
   b. applying a welding current to said longitudinal edges to be seamed at said workstation;
   c. applying a rotational force to said squeeze rollers; and,
   d. feeding said conical tube blank between said squeeze rollers at a speed which is a multiple of the linear surface speed of said rollers in the same direction.

13. A method as set forth in claim 12, wherein a welding current of a frequency of the order of 100 kc. or greater is applied along the edges of said V-shaped groove whereby, the concave face of said squeeze rollers will offer a high reactance path to said current favoring the conductance of the applied current along the edges of the skin of the conical tube blank between the edges and the apex of the V-shaped junction.

14. A method as set forth in claim 13, including the step of applying a guide member between the longitudinal edges.

15. A method as set forth in claim 13, wherein said current is applied by contacts disposed in advance of said V-shaped groove on both said edges.

16. A method as set forth in claim 13, wherein said squeeze rollers act as contacts, the high frequency current avoiding the high reactance inner concave face of the squeeze rollers in preference to the high conductance edges thereof.

17. A method as set forth in claim 12, wherein said welding being done by electric arc welding.

18. A method as set forth in claim 12, said welding being done by focussed beam welding.

* * * * *